March 8, 1927.
P. D. BARRETT
1,619,912
BRAKE EQUALIZING MECHANISM
Filed June 15, 1925   2 Sheets-Sheet 1
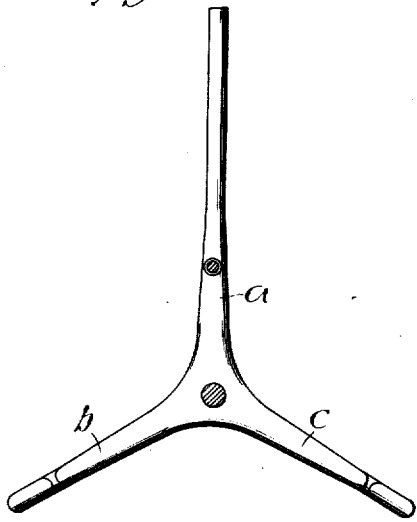
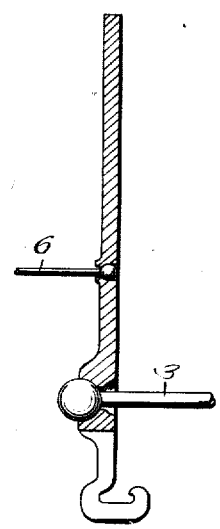
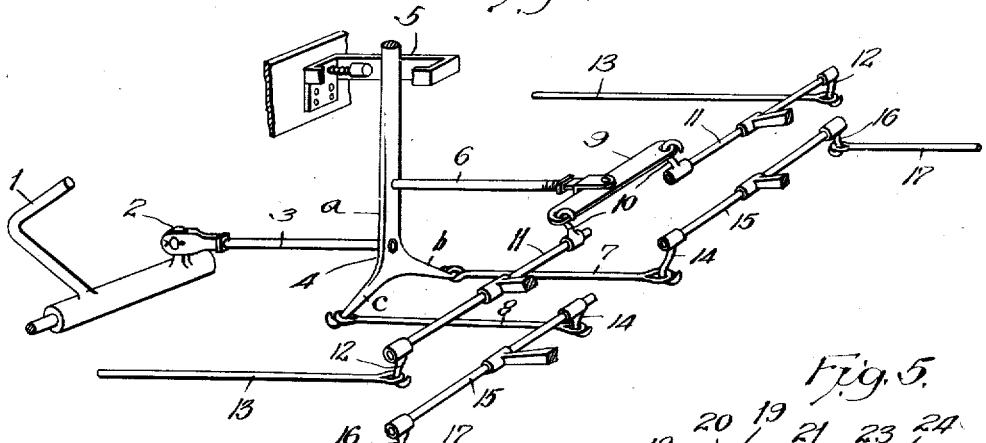
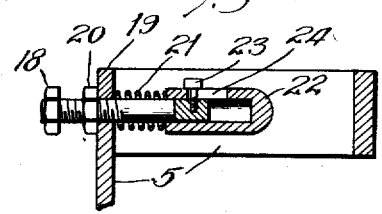
Inventor:
Paul D. Barrett
By White & Prost
his Attorneys

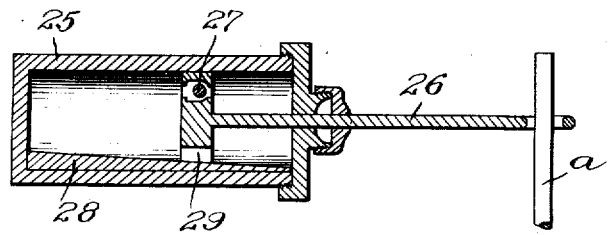
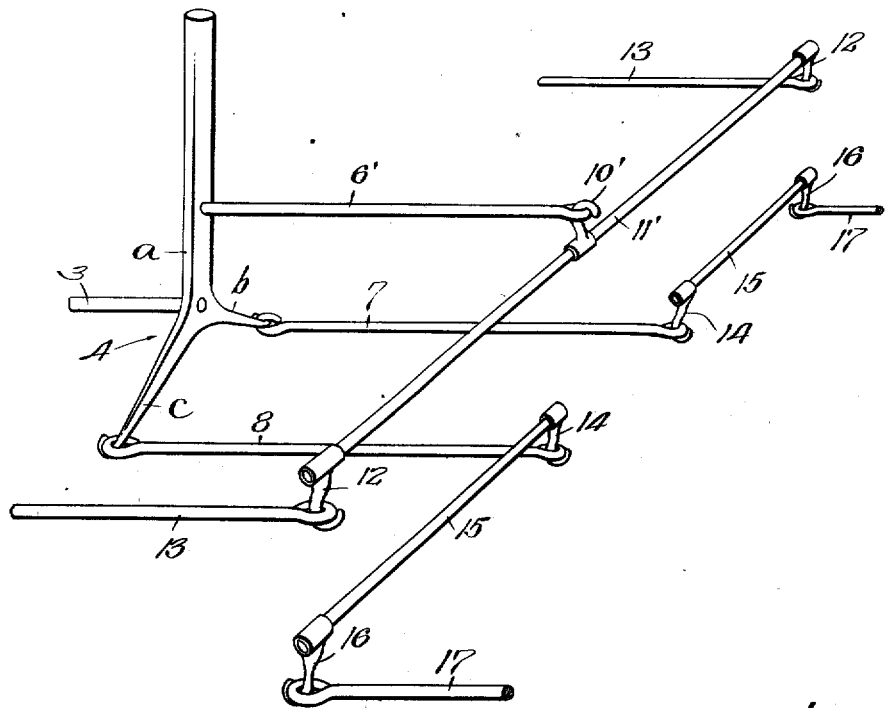

Patented Mar. 8, 1927.

1,619,912

UNITED STATES PATENT OFFICE.

PAUL D. BARRETT, OF SAN FRANCISCO, CALIFORNIA.

BRAKE-EQUALIZING MECHANISM.

Application filed June 15, 1925. Serial No. 37,219.

This invention relates to improvements in brake equalizing mechanism for automobile brakes and the like, and particularly to improvements in means for equalizing brakes upon one pair of wheels and simultaneously maintaining a desired ratio of braking pressures between the one pair of wheels and another pair of wheels; furthermore, to equalize the braking pressure of each pair respectively and simultaneously maintain an equal or differential ratio between the total pressures imparted by the respective pairs of brakes.

The primary object of my invention is to provide an improved mechanism for regulating the pressures imparted by a plurality of brakes upon an automobile or the like.

Another object is to provide an improved device for equalizing pressure imparted by one pair of brakes and simultaneously maintaining a ratio between said pressure and the pressures imparted by the other brakes of the vehicle.

A further object is to provide an improved means for preventing the failure of one pair of brakes from causing the failure of the other brakes on the vehicle.

A still further object is to provide an improved device for varying the ratio of the total pressure imparted by one pair of brakes to the pressures imparted by the other brakes during the progress of application.

I accomplish these and other objects by means of the device disclosed in the drawings forming a part of the present specification wherein like characters of reference are used to designate similar parts throughout said specification and drawings and in which, Fig. 1 is a plan view of the major compensating device. The letters *a*, *b*, and *c*, will be used to designate the respective arms of this device.

Fig. 2 is a cross sectional view of the aforesaid major compensating device showing a method of connecting the main pull rod to said major compensating device, and also a method of connection of the pull rod 6 from the equalizer bar 9 shown in Fig. 4, to the "*a*" arm of the major compensating device.

Fig. 3 is a detail view showing the nature of the hooks formed on the ends of the "*b*" and "*c*" arms of the major compensating device to facilitate the connection of pull rods thereto.

Fig. 4 is a perspective sketch showing the equalizing devices and sufficient of their immediate connections to enable one skilled in the art to determine their functions in equalizing pressures imparted by a plurality of brakes on an automobile or the like.

Fig. 5 is a cross sectional detail of the device which performs the dual function of varying the ratio of the total pressure applied by one pair of brakes to the total pressure supplied by the other pair of brakes during application of the brakes and of acting as a stop in the event of failure of one pair of brakes due to a severance or accidental disconnection of the linkage between the major compensating device 4 and either the front or the rear pair of brakes.

Fig. 6 is a cross sectional view of a fluid operated device for varying the ratio of the total pressure applied by one pair of brakes to the total pressure applied by the other pair of brakes.

Fig. 7 is a modified form of linkage similar to that shown in Fig. 4, but utilizing a one piece rock shaft.

Referring to the drawings it will be noted that no chassis or braking members are shown and it is assumed to be obvious that this mechanism may be adapted to any type of braking member and frame construction, and that while I have referred generally to pairs of brakes, the mechanism is equally applicable to a single brake, such as a transmission or propeller shaft brake, or to any combination of brakes, either singly or in pairs, or both.

The numeral 1 is used to designate in general a brake pedal or common operating means having a lever 2 connected to a pull rod 3 which in turn is suitably connected to a major compensating device 4 having arms *a*, *b*, and *c*, the angular difference of said arms (*a*, *b*, and *c*) being preferably, 120 degrees each from the others. At suitable points on the arms *a*, *b*, and *c*, the pull rods 6, 7, and 8 respectively, are operably connected. The opposite end of the pull rod 6 is rotatably connected to the center of the equalizer 9. Said equalizer 9 is connected at its ends to similar levers 10 which are mounted upon adjacent ends of the rock shafts 11. The opposite ends of the rock shafts 11 have mounted upon them the levers 12 which are similar to the levers 10 but point in the opposite direction. The pull rods 13 are connected to the levers 12 for transmitting the braking force to the front brakes. The pull rods 7 and 8 are connected at their opposite ends to similar levers 14 mounted upon adjacent ends of the rock shafts 15 which have similar levers 16 mounted on their opposite ends and pointing in the same direction as the levers 14. The pull rods 17 are connected to the levers 16 for transmitting the braking force to the rear brakes.

Taking up the description of the stop and ratio varying device 5 as shown in Fig. 5, the screw 18 passes through a correspondingly threaded hole in the stationary member 19 and has a lock nut 20 to secure its position at any desired setting. Around the body of the screw 18 passes an open helical spring 21, one end of which abuts against the stationary member 19 and the other end thereof abuts against the movable member 22 whose movement is limited by the pin 23 and the slot 24.

In operation the brakes are operated by depressing the foot pedal in the well known manner, the movement of the pedal operating to impart movement through the lever 2 and the rod 3 to the major compensating device 4. The major compensating device 4 in turn imparts movement to the equalizer 9 through the rod 6. The movement imparted to the equalizer 9 is transmitted through the levers 10, rock shafts 11, levers 12 and pull rods 13 to actuate the front brakes. The pivotal connection of the rod 6 with the center of the equalizer 9 and the hook and eye connections of the levers 10 with the ends of said equalizer causes the front brakes to be actuated to apply the same degree of pressure. The major compensating device 4 also imparts movement to the rock shafts 15 through the pull rods 7 and 8 and the levers 14 said movement being further transmitted through the levers 16 and pull rods 17 to actuate the rear brakes. By virtue of the freedom of movement permitted to the major compensating device 4 by the connections of the pull rods 3, 6, 7, and 8 thereto, the total force imparted to said major compensating device is divided between the arms "a", "b", and "c" in inverse proportion to the distances of the respective points of connection of the pull rods 6, 7, and 8 from the point of connection of the main pull rod 3.

In the event of failure of any part of the operating linkage connecting the front pair of brakes with the major compensating device 4 the consequent forward movement of the "a" arm of said major compensating device would be arrested by the movable member 22 of the stop and ratio varying device 5, said member 22 acting as a fulcrum, thereby permitting the major compensating device 4 to perform the dual function of acting as a lever and equalizer to transmit force to actuate the rear pair of brakes. Likewise, in the event of the failure of any part of the operating linkage connecting the rear pair of brakes with the major compensating device 4, the consequent backward movement of the "a" arm of said major compensating device would be arrested by the stationary member 19 of the stop and ratio varying device 5, said member 19 acting as a fulcrum, thereby permitting the major compensating device 4 to act as an ordinary lever to transmit force through the pull rod 6 and equalizer 9 to actuate the front brakes. Hence, the failure of one pair of brakes causing the failure of the other brakes on the vehicle is prevented.

By adjustment of the screw 18 of the stop and ratio varying device 5, the movable member 22 of said device can be made to come into contact with the "a" arm of the major compensating device 4 at a predetermined point along the forward travel of said arm, the further application of the brakes will cause the spring 21 to counteract a portion of the force received by the "a" arm of the major compensating device and in effect transfer said portion of the force in equal proportions to the "b" and "c" arms of the major compensating device. Hence, the variation of the ratio of the pressure imparted by one pair of brakes to the pressures imparted by the other brakes of the vehicle during progress of application can be accomplished.

In Fig. 6 is shown a device using fluid, preferably oil, which may take the place of the mechanical stop and ratio varying device 5. This modification preferably comprises a closed, fluid filled cylinder 25 suitably attached to a stationary part of the vehicle and provided with a suitable piston and associated rod 26 formed to engage the arm "a" of the major compensating device 4. The piston is provided with two apertures, one of which acts together with a ball 27, as a check valve permitting free fluid flow when the piston moves from left to right, in Fig. 6, and no fluid flow when the piston moves in the opposite direction. The fluid is consequently constrained to flow thru the other aperture 29 when the piston moves from right to left in response to application of the brakes. A wedge 28 is disposed in the cylinder and extends thru the aperture 29 so that as the brakes are applied the fluid flow is gradually restricted and an increasing resistance is offered to the movement of arm "a". The slope of the wedge 28 may be varied or curved to give any desired size to the aperture 29 at various piston positions. A dashpot effect is also secured with the fluid device, as a sudden application of the brake pedal 1 is effective at first in applying the rear brakes only, inasmuch as the fluid flow thru aperture 29 is comparatively slow. The applying force, however, moves the piston and rod 26 slowly to applied position and the front brakes are correspondingly actuated. The ends of the cylinder act as stops for the piston in case of failure of either set of brakes, and in that respect are similar to the stop device 5.

In the event it is found desirable, in order to meet the requirements of any particular type of vehicle, service, or road condition, the linkage shown in Fig. 7, which comprises a one piece rock shaft 11' with lever connection 10' to the pull rod 6' may be substituted for the pair of rock shafts 11, levers 10 and equalizer 9. It will be seen that the said substitution will limit equalization to one pair of brakes only, but will not affect the simultaneous maintenance of a ratio between the total pressures applied by the respective pairs of brakes.

While I have illustrated and described what I now consider to be the preferred embodiment of my invention, it is understood that the device may be modified in various ways both as to the form and construction of the several parts and also as to the arrangement without departing from the spirit of my invention. I do not wish to restrict myself closely to the precise disclosure made, but wish to avail myself of all such modifications as may fall within the scope of the appended claims.

Having thus described my invention what I claim as new and desire to secure by Letters Patent is,

1. A four wheel brake pressure compensating mechanism with transmission from a common operating member through said compensating mechanism to the braking members of all four wheels, said compensating mechanism comprising a unitary means for equalizing between one pair of brakes and simultaneously maintaining a ratio of braking pressures between the two pairs of brakes.

2. A four wheel brake pressure compensating mechanism with transmission from a common operating member through said compensating mechanism to the braking members of all four wheels, said compensating mechanism comprising an equalizer for one pair of brakes, and a unitary means for equalizing between the other pair of brakes and simultaneously maintaining a ratio of braking pressures between the two pairs of brakes.

3. A four wheel brake pressure compensating mechanism with transmission from a common operating member through said compensating mechanism to the braking members of all four wheels, said compensating mechanism comprising a unitary means for equalizing between one pair of brakes and simultaneously maintaining a ratio of braking pressures between the two pairs of brakes, and a means for preventing the failure of one pair of brakes causing the failure of the other pair of brakes.

4. A four wheel brake pressure compensating mechanism with transmission from a common operating member through said compensating mechanism to the braking members of all four wheels, said compensating mechanism comprising an equalizer for one pair of brakes, a unitary means for equalizing between the other pair of brakes and simultaneously maintaining a ratio of braking pressures between the two pairs of brakes, and a means for preventing the failure of one pair of brakes causing the failure of the other pair of brakes.

5. A four wheel brake pressure compensating mechanism with transmission from a common operating member through said compensating mechanism to the braking members of all four wheels, said compensating mechanism comprising a means for equalizing between one pair of brakes and simultaneously maintaining a ratio of braking pressures between the two pairs of brakes, a means for preventing the failure of one pair of brakes causing the failure of the other pair of brakes, and a means for varying the ratio of the total pressure applied by one pair of brakes to the total pressure applied by the other pair of brakes during application of the brakes.

6. A four wheel brake pressure compensating mechanism with transmission from a common operating member through said compensating mechanism to the braking members of all four wheels, said compensating mechanism comprising an equalizer for one pair of brakes, a means for equalizing between the other pair of brakes and simultaneously maintaining a ratio of braking pressures between the two pairs of brakes, a means for preventing the failure of one pair of brakes causing the failure of the other pair of brakes, and a means for varying the ratio of the total pressure applied by one pair of brakes to the total pressure applied by the other pair of brakes during application of the brakes.

7. In a brake mechanism, a brake pull rod, three secondary pull rods, and a unitary compensating device connected to said rod for distributing the motion of said brake pull rod to said secondary pull rods.

8. In a brake mechanism, a brake pull rod, and a compensating device having three arms for transmitting the pull of said brake pull rod to secondary pull rods attached to said three arms.

9. In a brake mechanism, a unitary compensating device having three radial arms, a brake pull rod universally connected to the center of said device, and secondary pull rods universally connected to said radial arms.

10. In a brake mechanism, a brake pull rod, a compensating device universally mounted at its center on said pull rod, and three secondary pull rods parallel to said brake pull rod and universally connected to said compensating device at three spaced points.

11. In a brake mechanism, a unitary compensating device having three arms, a brake pull rod connected to said device, secondary pull rods connected to said arms, and means for offering a yielding resistance to the motion of one of said arms.

12. In a brake mechanism, a brake pull rod, and a compensating device having three arms for attachment to secondary pull rods, said arms being contained in a plane or planes substantially normal to the axis of said brake pull rod.

In witness whereof I hereunto set my signature.

San Francisco, California, June 9th, 1925.

PAUL D. BARRETT.

a brake pull rod universally connected to the center of said device, and secondary pull rods universally connected to said radial arms.

10. In a brake mechanism, a brake pull rod, a compensating device universally mounted at its center on said pull rod, and three secondary pull rods parallel to said brake pull rod and universally connected to said compensating device at three spaced points.

11. In a brake mechanism, a unitary compensating device having three arms, a brake pull rod connected to said device, secondary pull rods connected to said arms, and means for offering a yielding resistance to the motion of one of said arms.

12. In a brake mechanism, a brake pull rod, and a compensating device having three arms for attachment to secondary pull rods, said arms being contained in a plane or planes substantially normal to the axis of said brake pull rod.

In witness whereof I hereunto set my signature.

San Francisco, California, June 9th, 1925.

PAUL D. BARRETT.

Certificate of Correction.

Patent No. 1,619,912.                        Granted March 8, 1927, to

PAUL D. BARRETT.

It is hereby certified that error appears in the printed specification of the above-numbered patent requiring correction as follows: Page 1, line 67, for the word "supplied" read *applied;* and that the said Letters Patent should be read with this correction therein that the same may conform to the record of the case in the Patent Office.

Signed and sealed this 26th day of April, A. D. 1927.

[SEAL.]                                          M. J. MOORE,
*Acting Commissioner of Patents.*

Certificate of Correction.

Patent No. 1,619,912. Granted March 8, 1927, to

PAUL D. BARRETT.

It is hereby certified that error appears in the printed specification of the above-numbered patent requiring correction as follows: Page 1, line 67, for the word "supplied" read *applied;* and that the said Letters Patent should be read with this correction therein that the same may conform to the record of the case in the Patent Office.

Signed and sealed this 26th day of April, A. D. 1927.

[SEAL.]

M. J. MOORE,
*Acting Commissioner of Patents.*